(12) United States Patent
Tada

(10) Patent No.: US 11,740,734 B2
(45) Date of Patent: Aug. 29, 2023

(54) DETECTION DEVICE AND DISPLAY DEVICE

(71) Applicant: Japan Display Inc., Tokyo (JP)

(72) Inventor: Kenshi Tada, Tokyo (JP)

(73) Assignee: Japan Display Inc., Tokyo (JP)

( * ) Notice: Subject to any disclaimer, the term of this patent is extended or adjusted under 35 U.S.C. 154(b) by 167 days.

(21) Appl. No.: 17/412,559

(22) Filed: Aug. 26, 2021

(65) Prior Publication Data

US 2021/0383094 A1 Dec. 9, 2021

Related U.S. Application Data

(63) Continuation of application No. PCT/JP2020/009579, filed on Mar. 6, 2020.

(30) Foreign Application Priority Data

Mar. 8, 2019 (JP) .................................. 2019-043006

(51) Int. Cl.
*G06F 3/041* (2006.01)
*G06F 3/044* (2006.01)
(Continued)

(52) U.S. Cl.
CPC ........ *G06F 3/04166* (2019.05); *G06F 3/0446* (2019.05); *G06V 40/1306* (2022.01); *G06V 40/1365* (2022.01); *G06F 2203/04105* (2013.01)

(58) Field of Classification Search
CPC ............ G06V 40/1365; G06V 40/1306; G06F 3/04166; G06F 3/0446; G06F 2203/04105; G06F 2203/04103; G06F 3/0445
See application file for complete search history.

(56) References Cited

U.S. PATENT DOCUMENTS

| 2010/0153752 A1 | 6/2010 | Tsukamoto et al. |
| 2017/0123566 A1 | 5/2017 | Noguchi |
(Continued)

FOREIGN PATENT DOCUMENTS

| JP | 2000-315118 A | 11/2000 |
| JP | 2010-146048 A | 7/2010 |
| JP | 2017-084138 A | 5/2017 |

OTHER PUBLICATIONS

International Search Report issued in International Patent Application No. PCT/JP2020/009579 dated Apr. 7, 2020 and English translation of same. 6 pages.
(Continued)

*Primary Examiner* — Premal R Patel
(74) *Attorney, Agent, or Firm* — K&L Gates LLP

(57) ABSTRACT

A detection device includes: a first electrode extending in a first direction along a detection face; a plurality of second electrodes extending in a second direction along the detection face, and facing the first electrode; a signal output circuit configured to output a signal to the first electrode; a detection circuit that detects capacitance generated between the first electrode and the second electrodes in accordance with the signal; and a force-sensing element configured to detect force applied to the detection face. A plurality of first electrode blocks each including a plurality of the first electrodes are arranged in the second direction. The signal output circuit is switched between a first mode of outputting the signal to the first electrode blocks at different times and a second mode of outputting the signal to some of the first electrodes and starts operation on the second mode when the force is detected.

7 Claims, 9 Drawing Sheets

(51) Int. Cl.
G06V 40/12 (2022.01)
G06V 40/13 (2022.01)

(56) References Cited

U.S. PATENT DOCUMENTS

| | | |
|---|---|---|
| 2017/0316249 A1* | 11/2017 | Lee .................... G06V 40/1365 |
| 2017/0351850 A1 | 12/2017 | Jin et al. |
| 2018/0113346 A1* | 4/2018 | Han .................... G06F 3/04164 |
| 2018/0232092 A1* | 8/2018 | Lee ...................... G06F 3/0443 |
| 2018/0329560 A1* | 11/2018 | Kim ..................... G06F 3/0487 |
| 2018/0373920 A1 | 12/2018 | Shi |
| 2019/0204950 A1* | 7/2019 | Luo ........................ G06F 3/047 |
| 2020/0174616 A1 | 6/2020 | Noguchi |

OTHER PUBLICATIONS

Written Opinion issued in International Patent Application No. PCT/JP2020/009579 dated Apr. 7, 2020. 4 pages.

* cited by examiner

DETECTION DEVICE AND DISPLAY DEVICE

CROSS-REFERENCE TO RELATED APPLICATION

This application claims the benefit of priority from Japanese Patent Application No. 2019-043006 filed on Mar. 8, 2019 and International Patent Application No. PCT/JP2020/009579 filed on Mar. 6, 2020, the entire contents of which are incorporated herein by reference.

BACKGROUND

1. Technical Field

What is disclosed herein relates to a detection device and a display device.

2. Description of the Related Art

It is known that there is a configuration in which a display device with a touch detection function functions as a fingerprint detection device (Japanese Patent Application Laid-open Publication No. 2000-315118, for example).

Performing detection at a resolution at which a fingerprint can be determined requires a resolution higher than that of mere touch detection and thus requires higher power consumption. Consequently, to achieve power saving, it is required that fingerprint detection be performed only when a fingerprint needs to be detected. However, such power saving has not conventionally been achieved.

For the foregoing reasons, there is a need for a detection device and a display device that can achieve further power saving.

SUMMARY

According to an aspect, a detection device includes: a first electrode extending in a first direction along a detection face; a plurality of second electrodes extending in a second direction that crosses the first direction along the detection face, and facing the first electrode; a signal output circuit configured to output a signal to the first electrode; a detection circuit configured to detect capacitance generated between the first electrode and the second electrodes in accordance with the signal; and a force-sensing element configured to detect force applied to the detection face. A plurality of first electrode blocks each including a plurality of the first electrodes are arranged in the second direction. The signal output circuit is provided to be switched between a first mode of outputting the signal to the first electrode blocks at different times and a second mode of outputting the signal to some of the first electrodes and is configured to start operation on the second mode when the force is detected.

DETAILED DESCRIPTION

The following describes an embodiment of the present disclosure with reference to the accompanying drawings. The disclosure is only by way of example, and appropriate modifications with the gist of the disclosure maintained that can easily be conceived by those skilled in the art are naturally included in the scope of the present disclosure. The drawings may be represented more schematically for the width, thickness, shape, and the like of parts than those of actual aspects in order to make the description clearer; they are only by way of example and do not limit the interpretation of the present disclosure. In the present specification and drawings, components similar to those previously described for the drawings previously described are denoted by the same symbols, and a detailed description may be omitted as appropriate.

In this disclosure, when an element is described as being "on" another element, the element can be directly on the other element, or there can be one or more elements between the element and the other element.

Figure 1:
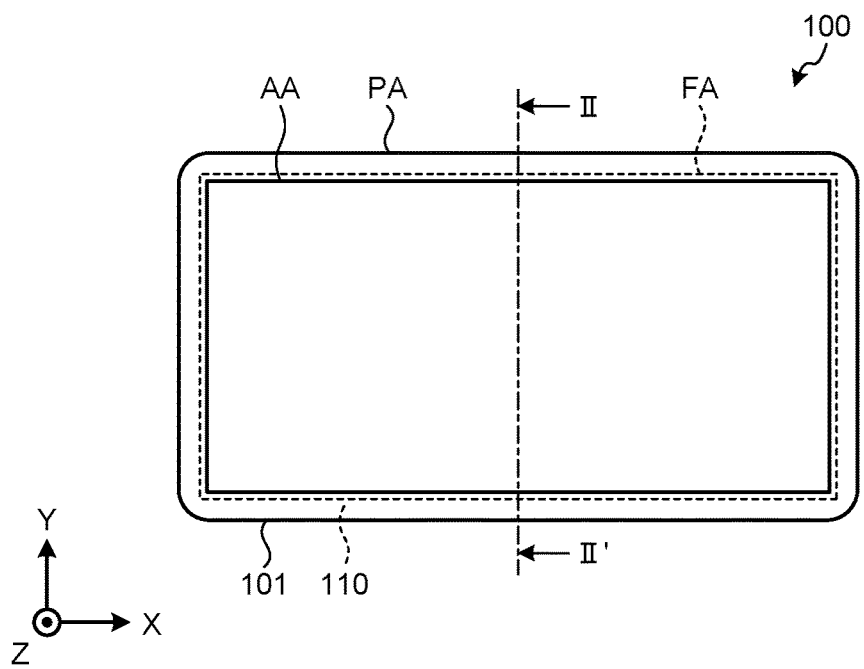
FIG. 1 is a plan view of a display device having a detection device according to an embodiment.

FIG. 1 is a plan view of a display device having a detection device according to an embodiment. As illustrated in FIG. 1, a display device 100 of the embodiment has a display area AA, a peripheral area PA, and a detection area FA. The display area AA is an area displaying an image of a display panel 30 (refer to FIG. 2). In other words, the display area AA is an area in which display elements Pix (pixels) included in the display panel 30 are disposed. The detection area FA is an area detecting recesses and protrusions on the surface of a finger Fin (refer to, for example, FIG. 2) or the like being in contact therewith or proximity thereto. In other words, the detection area FA is an area in which sensing elements such as a first sensing element 10*f* (a fingerprint-sensing element) and a second sensing element 10*p* (a force-sensing element) are disposed. The detection area FA is provided overlapping with the display area AA. The peripheral area PA is an area outside the detection area FA. The peripheral area PA is an area outside the display area AA. In other words, the peripheral area PA is an area in which circuits, wiring, and the like to drive the sensing elements placed in the detection area FA are disposed.

Figure 2:
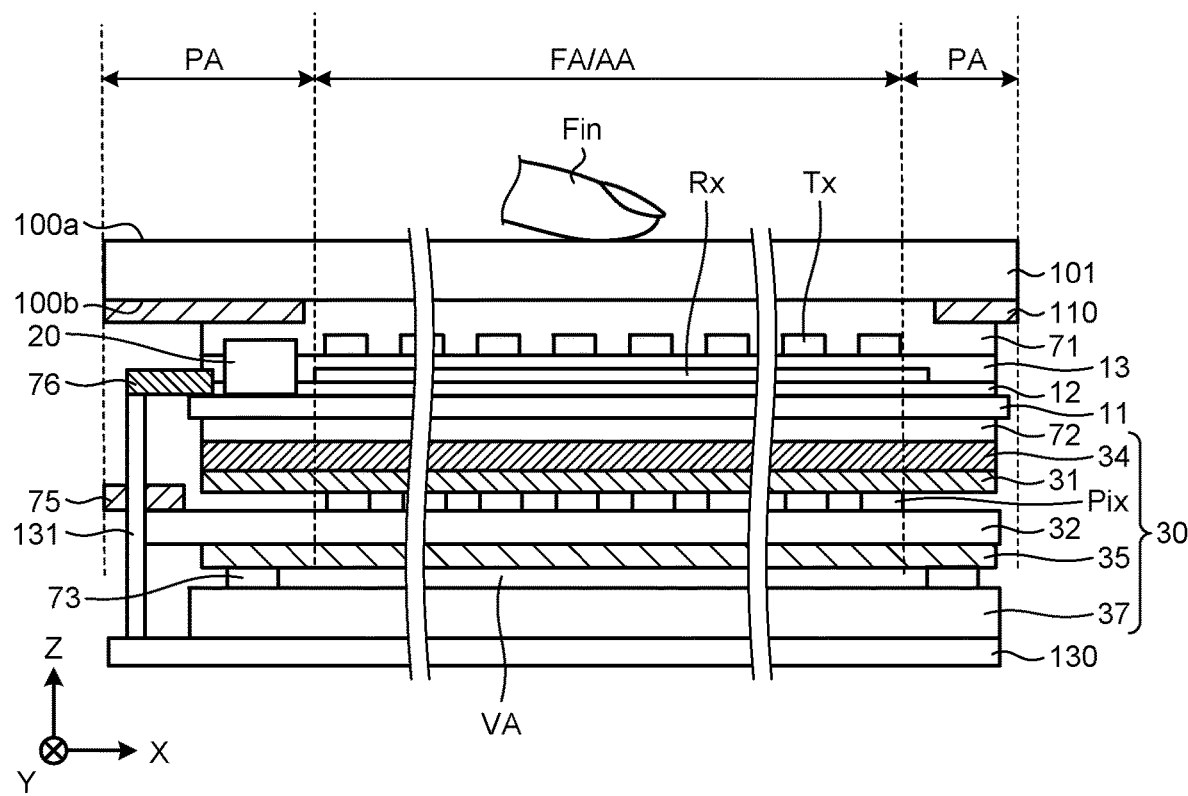
FIG. 2 is a sectional view along the II-II' line in FIG. 1.

FIG. 2 is a sectional view along the II-II' line in FIG. 1. As illustrated in FIG. 2, the display device 100 of the embodiment includes a cover member 101, a detection device 1, the display panel 30, and a force detection member 130. The cover member 101 is a plate-like member having a first face 101*a* and a second face 101*b* on the opposite side from the first face 101*a*. The display device 100 has a detection face detecting the recesses and protrusions on the surface of the finger Fin or the like being in contact therewith or proximity thereto. The display device 100 has a display face displaying the image of the display panel 30. The display face and the detection face each correspond to the outermost face of the display device 100, and in the present embodiment, the first face 101a of the cover member 101 corresponds to the detection face and the display face. The display panel 30 and a sensor 10 of the detection device 1 are provided on the second face 101b side of the cover member 101. The cover member 101 is a member to protect the sensor 10 and the display panel 30 and is provided covering the sensor 10 and the display panel 30. The cover member 101 is a glass substrate, a resin substrate, or a resin film, for example.

In the description of the embodiment, two directions along the detection face are defined as X direction and Y direction, whereas a direction orthogonal to the detection face is defined as Z direction. Although the X direction and the Y direction are orthogonal to each other, for example, this is not limiting; they are only required to be orthogonal to the Z direction and to cross each other.

The cover member 101, the sensor 10, and the display panel 30 are not limited to have a rectangular shape in a plan view and may have a circular shape, an oval shape, or an irregular shape in which parts of the outline of any one of these regular shapes are omitted. The shapes of the cover member 101, the sensor 10, and the display panel 30 in a plan view may be different from each other, such as a case in which the cover member 101 is circular-shaped, whereas the sensor 10 and the display panel 30 are regular polygonal-shaped or the like. The cover member 101 is not limited to be plate-shaped; a curved display having a curved face may be employed, such as a case in which the display area AA includes a curved face or the peripheral area PA is curved toward the display panel 30.

As illustrated in FIG. 1 and FIG. 2, in the peripheral area PA, a decorating layer 110 is provided on the second face 101b of the cover member 101. The decorating layer 110 is a colored layer having a smaller light transmittance than that of the cover member 101. The decorating layer 110 can inhibit wiring, circuits, and the like provided overlapping the peripheral area PA from being visually recognized by an observer. Although the decorating layer 110 is provided on the second face 101b in the example illustrated in FIG. 2, it may be provided on the first face 101a. The decorating layer 110 is not limited to a single layer and may be a configuration that has a plurality of layers stacked on each other.

The detection device 1 has the sensor 10 including the first sensing element 10f and the second sensing element 10p, and a controller 20 including circuits and wiring that control the sensor 10. The first sensing element 10f is the fingerprint-sensing element detecting the recesses and protrusions (a fingerprint or the like) on the surface of the finger Fin or the like being in contact with or proximity to the detection face. The second sensing element 10p is the force-sensing element detecting variations caused by force applied via the detection face by the finger Fin or the like. The controller 20 includes, for example, a first electrode selection circuit 25, a first detection circuit 40, and a second detection circuit 135. The first electrode selection circuit 25 is a signal output circuit to drive the sensor 10. The first detection circuit 40 detects position coordinates of the fingerprint, the finger, or the like based on a first output signal Vdet1 from the sensor 10. The second detection circuit 135 detects a change produced by the applied force, based on a second output signal Vdet2 from the sensor 10. As illustrated in FIG. 2, the detection device 1 includes a first sensor substrate 11, an insulating layer 12, second electrodes Rx, an insulating layer 13, first electrodes Tx, and the controller 20. The insulating layer 12 is disposed on the first sensor substrate 11. The insulating layer 12 is used for providing switching elements and the like included in the controller 20 and is an inorganic or organic insulating layer. The first electrodes Tx and the second electrodes Rx are disposed facing each other with the insulating layer 13 interposed therebetween on the first sensor substrate 11. The first sensing element 10f includes the first electrodes Tx and the second electrodes Rx disposed in the detection area FA on the first sensor substrate 11. The first sensing element 10f of the detection device 1 is provided on the display panel 30. That is to say, the first sensing element 10f is provided between the cover member 101 and the display panel 30 and overlaps with the display panel 30 when viewed in a direction perpendicular to the first face 101a. The first sensor substrate 11, to which a wiring board 76 is coupled, can output the output signals from the sensor 10 to the outside. The wiring board 76 is a flexible printed board, for example.

One face of the first sensing element 10f (the first electrodes Tx) is bonded to the cover member 101 with an adhesive layer 71 therebetween. The other face of the first sensing element 10f (first sensor substrate 11) is bonded to a polarizing plate 34 of the display panel 30 with an adhesive layer 72 therebetween. The adhesive layer 71 is, for example, a liquid UV curable resin, such as an optical clear resin (OCR) or a liquid optically clear adhesive (LOCA). The adhesive layer 72 is an optical clear adhesive (OCA), for example.

The display panel 30 has a first substrate 31, a second substrate 32, a polarizing plate 34 provided on the upper side of the first substrate 31, and a polarizing plate 35 provided on the lower side of the second substrate 32. A wiring board 75 is coupled to the second substrate 32. Alternatively, the wiring board 75 may be coupled to the first substrate 31. The wiring board 75 is a flexible printed board, for example. Each of the display elements Pix is disposed between the first substrate 31 and the second substrate 32. In the present embodiment, the display element Pix is a liquid crystal display element including a liquid crystal layer. The display panel 30 has an illumination device 37 configured to emit light to the display element Pix and provided on the lower side of the polarizing plate 35. That is to say, the display panel 30 is a liquid crystal panel. The display panel 30 is not limited to the liquid crystal panel and may be a self-luminous display panel including an inorganic light emitting element or an organic light emitting element (organic light emitting diode (OLED)) or an electronic paper type display panel including an electrophoretic element, for example. In the case of using the self-luminous display panel, the electronic paper type display panel, or a reflective liquid crystal panel, it may not be necessary to provide the illumination device 37. In the case of using the self-luminous display panel and the electronic paper type display panel, it may not be necessary to provide the polarizing plates 34 and 35.

As illustrated in FIG. 2, the detection device 1 further has a force detection member 130 and adhesive members 73. The adhesive members 73 are disposed between the first electrodes Tx and the force detection member 130 to form a variable area VA varying by force applied onto the detection face. Each of the adhesive members 73 is double-sided adhesive tape, for example, to form the variable area VA between the illumination device 37 and the polarizing plate 35. The variable area VA is formed of an air layer, for example. The first electrodes Tx and the second electrodes Rx are formed on the first sensor substrate 11; and the second sensing element 10p includes either the first electrodes Tx or the second electrodes Rx, or both of them and also includes the force detection member 130. The force detection member 130 is coupled to the controller 20 via a conduction member 131 and the wiring board 76. The conduction member 131 may be coupled to the first sensor substrate 11, whereas the force detection member 130 may be coupled to the controller 20 via wiring on the first sensor substrate 11.

The first sensing element 10f of the sensor 10 is disposed at a position closer to the cover member 101 than the display panel 30 in the Z direction. Thus, the distance between the first electrodes Tx and the second electrodes Rx as detection electrodes and the first face 101a as the detection face can be made short. Consequently, the display device 100 including the detection device 1 of the embodiment can improve detection performance.

Figure 3:
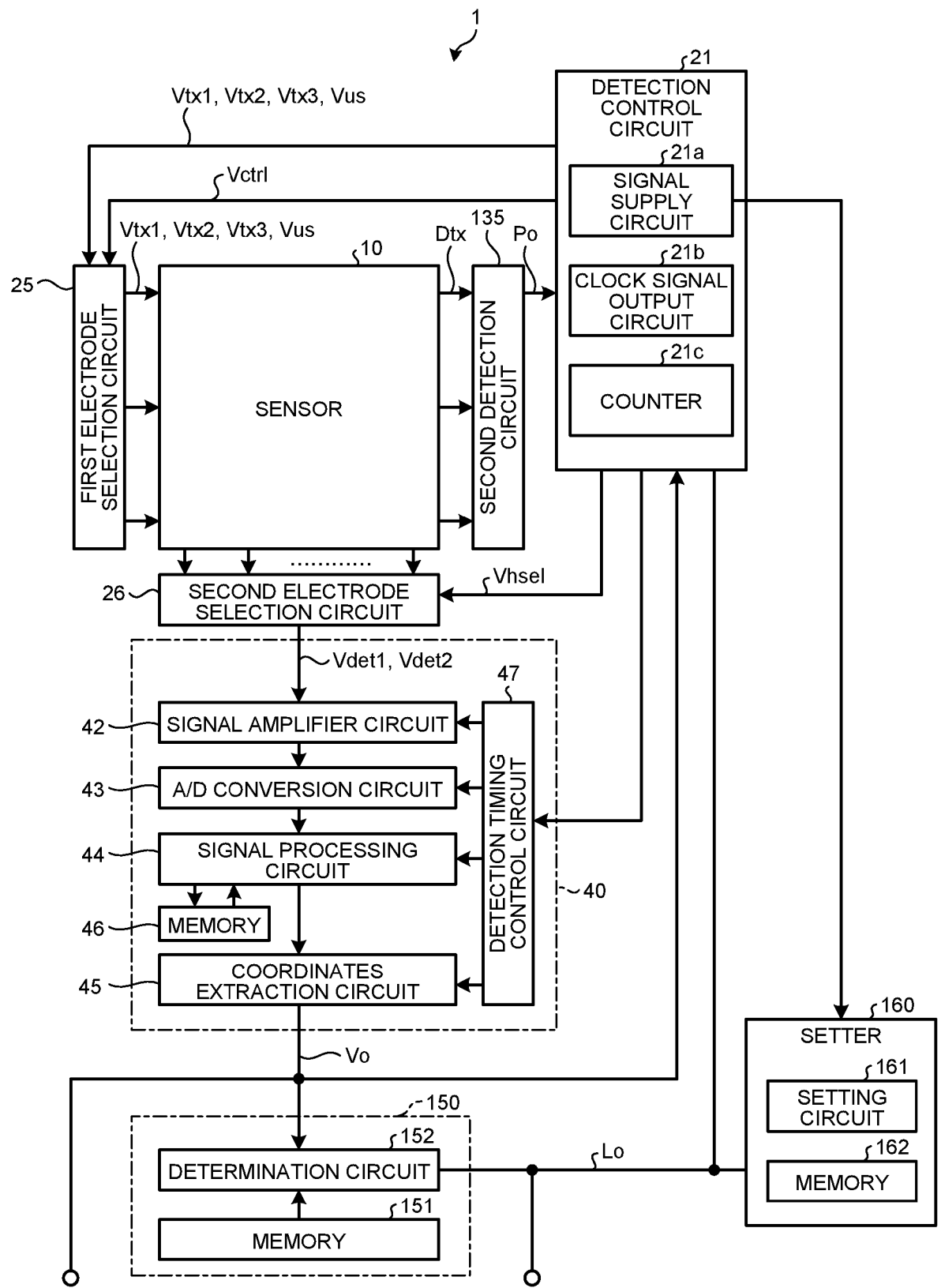
FIG. 3 is a block diagram of a configuration example of the detection device according to the embodiment.

The following describes a detailed configuration of the detection device 1. FIG. 3 is a block diagram of a configuration example of the detection device according to the embodiment. As illustrated in FIG. 3, the detection device 1 has the sensor 10 and the controller 20, in which the controller 20 includes a detection control circuit 21, the first electrode selection circuit 25, a second electrode selection circuit 26, the first detection circuit 40, the second detection circuit 135, and a determiner 150.

Figure 4:
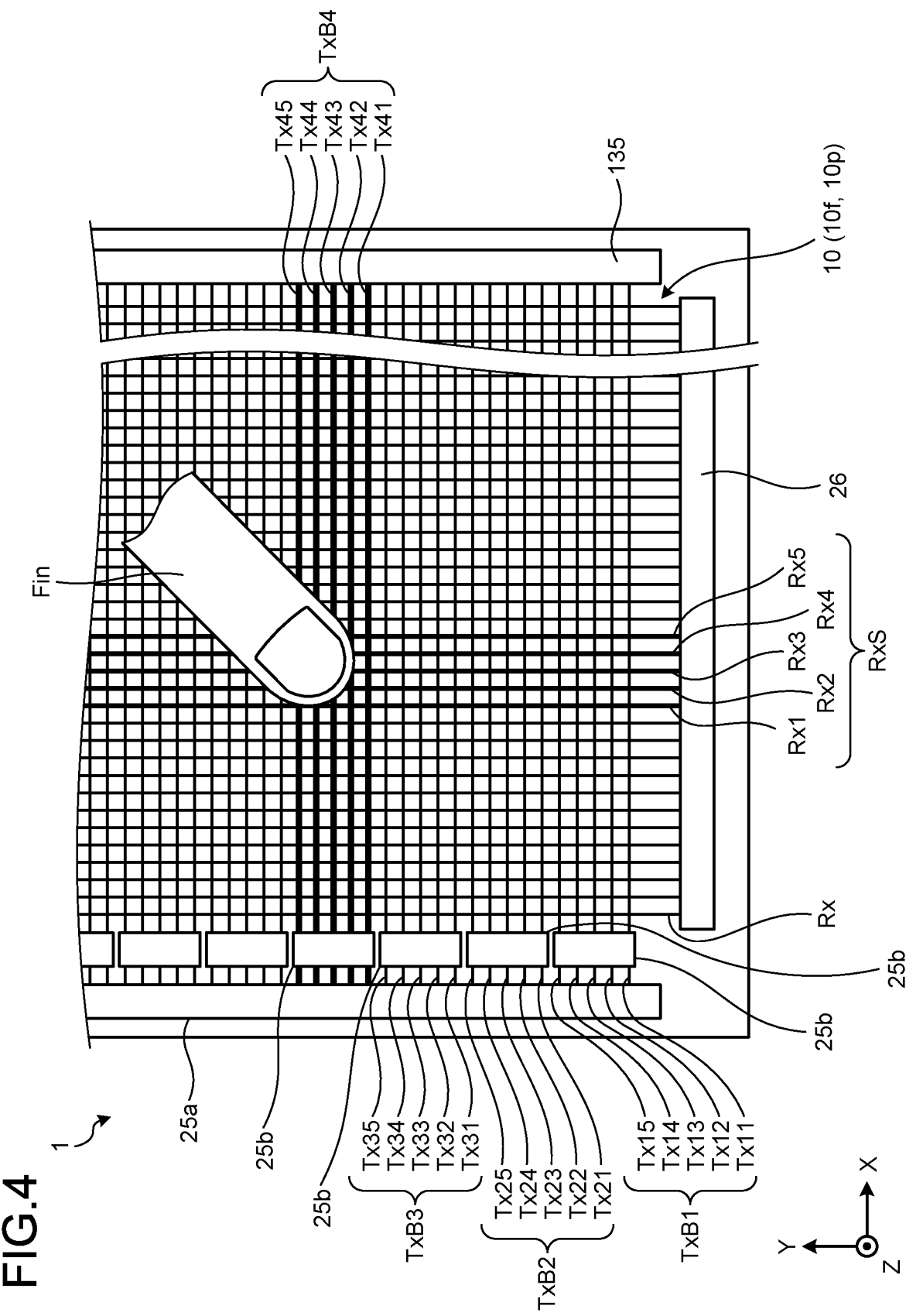
FIG. 4 is a schematic diagram of a configuration of a sensor and a method for detecting a finger and a fingerprint pattern by the sensor.

FIG. 4 is a schematic diagram of a configuration of the sensor and a method for detecting the finger Fin and a fingerprint pattern by the sensor. The sensor 10 includes the first electrodes Tx (refer to FIG. 5) and the second electrodes Rx. The first electrodes Tx extend in the X direction. In the sensor 10, a plurality of first electrode blocks TxB each including the first electrodes Tx are arranged in the Y direction.

In FIG. 4, in order from one end of the sensor 10 toward the other end thereof in the Y direction, the first electrode blocks are arranged, such as a first electrode block TxB1, a first electrode block TxB2, a first electrode block TxB3, a first electrode block TxB4, . . . .

Each of the first electrode blocks TxB includes n first electrodes Tx. Although n=5 in the present example, this is not limiting; n may be an integer of 2 or greater. The Nth first electrode block TxBN from the one end in the Y direction includes a first electrode TxN1, a first electrode TxN2, a first electrode TxN3, a first electrode TxN4, and a first electrode TxN5, for example. N is an integer of 1 or greater.

In the embodiment, the first electrode selection circuit 25 includes a first electrode block selection circuit 25a and unit first electrode selection circuits 25b. The first electrode block selection circuit 25a is a selection circuit selecting the first electrode block TxB including the first electrodes Tx to which a drive signal Vtx is supplied. In other words, the first electrode block selection circuit 25a supplies a first electrode block selection signal Vfbs to the unit first electrode selection circuit 25b coupled to the first electrodes Tx included in the selected first electrode block TxB. Each unit first electrode selection circuit 25b is a selection circuit selecting the first electrodes Tx to which the drive signal Vtx is supplied within the first electrode block TxB selected by the first electrode block selection circuit 25a. In other words, each unit first electrode selection circuit 25b supplies the drive signal Vtx to the first electrodes Tx selected within the first electrode block TxB based on the first electrode block selection signal Vfbs from the first electrode block selection circuit 25a.

The first electrode block selection circuit 25a includes a shift register, for example, and supplies the first electrode block selection signal Vfbs simultaneously to the unit first electrode selection circuits 25b corresponding to the first electrodes Tx included in the selected first electrode block TxB based on a clock signal from the detection control circuit 21. The unit first electrode selection circuit 25b includes a decoder, an AND circuit, a switching element, and a drive signal supply line, for example. A first electrode selection signal Vfs is supplied to the first electrodes Tx to which the drive signal Vtx is supplied within the first electrode block TxB by the decoder. The first electrodes Tx and the drive signal supply line are coupled to each other via the switching element to which the first electrode block selection signal Vfbs and the first electrode selection signal Vfs have been supplied via the AND circuit.

The first electrodes Tx are coupled to the second detection circuit 135. The first electrodes Tx may output, to the second detection circuit 135, one output signal for each of the first electrode blocks TxB. For example, switching elements 135s are provided such that a first end of each switching element 135s is coupled to a corresponding first electrode Tx, whereas second ends of all the switching elements 135s corresponding to the first electrodes Tx included in the first electrode block TxB are coupled to one common wiring line. Thus, all the switching elements 135s corresponding to the first electrode block TxB are simultaneously turned on, whereby one output signal is output for each of the first electrode block TxB.

The second electrodes Rx extend in the Y direction. The second electrodes Rx face the first electrodes Tx in the Z direction so as not to be in contact therewith. The second electrodes Rx are coupled to the second electrode selection circuit 26.

Figure 5:
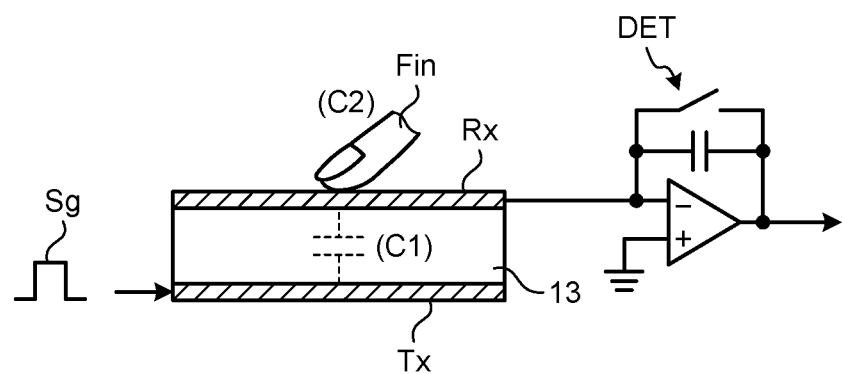
FIG. 5 is an illustrative diagram for illustrating mutual capacitive detection control.

The detection device 1 performs capacitive detection control. The following describes mutual capacitive detection control of the detection device 1 of the embodiment with reference to FIG. 5. FIG. 5 is an illustrative diagram for illustrating the mutual capacitive detection control. FIG. 5 also illustrates the first detection circuit 40.

As illustrated in FIG. 5, a capacitance element C1 is formed by a first electrode Tx and a second electrode Rx, which are a pair of electrodes disposed facing each other with the insulating layer 13 interposed therebetween. The capacitance element C1 produces a fringe electric field extending from an end of the first electrode Tx toward an upper face of the second electrode Rx in addition to an electric filed formed between opposite faces of the first electrode Tx and the second electrode Rx. To the first electrode Tx, the drive signal Vtx is supplied via the first electrode selection circuit 25, whereas the second electrode Rx is coupled to the first detection circuit 40. The first detection circuit 40 includes a plurality of detection circuits (voltage detectors DET). The voltage detectors DET are each an integrating circuit, for example.

The drive signal to be supplied to the first electrode Tx is, for example, an alternating-current (AC) rectangular wave Sg with a certain frequency (a few kilohertz to a few hundred kilohertz, for example). A current depending on a capacitance value of the capacitance element C1 passes through the voltage detector DET. The voltage detector DET converts current variations according to the AC rectangular wave Sg into voltage variations.

When a capacitance C2 formed by a conductor (the finger Fin) comes into contact with the second electrode Rx or, when the capacitance C2 comes as close thereto as it can be identified as being in contact therewith, the fringe electric field between the first electrode Tx and the second electrode Rx is interrupted by the conductor (the finger Fin). Specifically, as the capacitance C2 formed by the conductor (the finger Fin) comes close to the second electrode Rx, the degree of the interruption of the fringe electric field between the first electrode Tx and the second electrode Rx by the conductor increases. Thus, the capacitance element C1 works as a capacitance element the capacitance value of which becomes gradually smaller as the conductor comes close to the second electrode than a capacitance value when being in a noncontact state.

The amplitude of a voltage signal output from the voltage detector DET becomes smaller as the recesses and protrusions on the finger Fin or the like come close to a contact state than in a noncontact state. An absolute value |ΔV| of this voltage difference will change in accordance with the degree of the influence of a detection object being in contact or proximity. The first detection circuit 40 determines the recesses and protrusions on the finger Fin or the like based on the absolute value |ΔV|. The first detection circuit 40 compares the absolute value |ΔV| with a certain threshold voltage to determine whether the detection object is in a noncontact state or is in a contact state or a proximity state. Thus, the detection device 1 (the sensor 10) can perform the detection control of the mutual capacitance system. The "contact state" includes a state in which the finger Fin is in contact with the detection face or a state in which a finger Fin is as close thereto as it can be identified as being in contact therewith. The "noncontact state" includes a state in which a finger Fin is not in contact with the detection face or a state in which the finger Fin is not as close thereto as it can be identified as being in contact therewith.

The sensor 10 is scanned on a first electrode block TxB basis by time-division selection drive in accordance with a first drive signal Vtx1 supplied from the first electrode selection circuit 25 and can thereby perform detection of a touch operation on the detection face (touch detection) across the entire detection area FA. In the following, an operating mode when the touch detection is performed is referred to as a first mode M1. For example, in a first touch detection period of the first mode M1, the first electrode block selection circuit 25a selects the first electrode block TxB1, whereas the unit first electrode selection circuit 25b supplies the first drive signal Vtx1 to m first electrodes Tx adjacent to each other included in the first electrode block TxB1. m is an integer of n or less. In a second touch detection period following the first touch detection period, the first electrode block selection circuit 25a selects the first electrode block TxB2, whereas the unit first electrode selection circuit 25b supplies the first drive signal Vtx1 to m first electrodes Tx adjacent to each other included in the first electrode block TxB2.

The first electrodes Tx of the first electrode block TxB in which the finger Fin has been detected are scanned on a first electrode Tx basis by time-division selection drive in accordance with a second drive signal Vtx2 supplied from the first electrode selection circuit 25, whereby sensor 10 can perform detection of the recesses and protrusions (the fingerprint) on the surface of a conductor, such as a finger Fin or the like (fingerprint detection). In the following, an operating mode when the fingerprint detection is performed is referred to as a second mode M2. For example, in a first fingerprint detection period of the second mode M2, the first electrode block selection circuit 25a selects the first electrode block TxB1, whereas the unit first electrode selection circuit 25b supplies the second drive signal Vtx2 to the first electrode Tx selected from the first electrode block TxB1 by a first selection pattern based on a certain sign. The certain sign is, for example, a Hadamard matrix, and the first selection pattern based on the certain sign is a pattern corresponding to each row or each column of the Hadamard matrix. In a second fingerprint detection period following the first fingerprint detection period, the first electrode block selection circuit 25a selects the first electrode block TxB1, whereas the unit first electrode selection circuit 25b supplies the second drive signal Vtx2 to the first electrodes Tx selected from the first electrode block TxB1 by a second selection pattern based on the certain sign. In other words, in the second mode M2, the first electrode selection circuit 25 performs code division multiplexing (CDM) drive. The first drive signal Vtx1 and the second drive signal Vtx2 may be signals having the same amplitude or potential.

In the present example, the operation in the second mode M2 is executed after the operation in the first mode M1 and is performed based on an area in which the proximity or contact of the conductor (the finger Fin) has been detected in the touch detection of the first mode M1. For example, as illustrated in FIG. 4, when the first drive signal Vtx1 has been supplied to the first electrode block TxB4, and the proximity or contact of the conductor has been detected based on an output signal from a second electrode block RxS including second electrodes Rx1, Rx2, Rx3, Rx4, and Rx5 by the operation in the first mode M1, the fingerprint detection in the second mode M2 is performed on the detection face at a position overlapping the first electrode block TxB4 and the second electrode block RxS. For example, the second drive signal Vtx2 is supplied to the first electrodes Tx included in the first electrode block TxB4 based on the certain sign, and the output signal is detected for each second electrode Rx included in the second electrode block RxS in a time-division manner or by different detection circuits (the voltage detectors DET).

The detection control circuit 21 is a circuit supplying a control signal to each of the first electrode selection circuit 25, the second electrode selection circuit 26, the first detection circuit 40, and the second detection circuit 135 to control operations of these circuits. The detection control circuit 21 includes a signal supply circuit 21a, a clock signal output circuit 21b, and a counter 21c. The signal supply circuit 21a is a circuit selectively supplying any of the first drive signal Vtx1, the second drive signal Vtx2, and a third drive signal Vtx3. The signal supply circuit 21a is a circuit supplying, to the first electrode selection circuit 25, a certain potential Vus to be supplied to the first electrodes Tx that are not selected. The certain potential Vus is a reference potential (a ground potential), for example. The detection control circuit 21 supplies various control signals Vctrl to the first electrode selection circuit 25 based on a clock signal of the clock signal output circuit 21b. The counter 21c counts an operating time in the second mode, which will be described later.

The first electrode selection circuit 25 is a circuit simultaneously selecting the first electrodes Tx based on the various control signals Vctrl. The first electrode selection circuit 25 supplies the first drive signal Vtx1, the second drive signal Vtx2, or the third drive signal Vtx3, which will be described later, to the selected first electrodes Tx. The sensor 10 varies a state of selection of the first electrodes Tx by the first electrode selection circuit 25 and can thereby achieve a plurality of operating modes such as the first mode M1, the second mode M2, and a third mode M3, which will be described below (refer to FIG. 7 to FIG. 9).

The second electrode selection circuit 26 is a switch circuit selecting one or more from among the second electrodes Rx (refer to FIG. 4). For example, in the first mode, the second electrode selection circuit 26 couples the first detection circuit 40 with the second electrodes Rx on a second electrode block RxS basis based on a second electrode selection signal Vhsel supplied from the detection control circuit 21 to output the first output signal Vdet1, each second electrode block RxS including more than one second electrode Rx. In the second mode, the second electrode selection circuit 26 couples the second electrodes Rx included in the second electrode block RxS with the first detection circuit 40 in a time-division manner to output the second output signal Vdet2.

The first detection circuit 40 is a circuit detecting the presence or absence of a touch based on the control signal supplied from the detection control circuit 21 and the first output signal Vdet1 and the second output signal Vdet2 supplied from the sensor 10. The first detection circuit 40 includes a signal amplifier circuit 42, an analog-to-digital (A/D) conversion circuit 43, a signal processing circuit 44, a coordinates extraction circuit 45, a memory 46, and a detection timing control circuit 47. The detection timing control circuit 47 performs control to cause the signal amplifier circuit 42, the A/D conversion circuit 43, the signal processing circuit 44, and the coordinates extraction circuit 45 to operate in sync with each other based on the control signal supplied from the detection control circuit 21.

The sensor 10 supplies the first output signal Vdet1 and the second output signal Vdet2 to the signal amplifier circuit 42. The signal amplifier circuit 42 amplifies the first output signal Vdet1 and the second output signal Vdet2. The signal amplifier circuit 42 corresponds to the voltage detector DET. The A/D conversion circuit 43 converts an analog signal output from the signal amplifier circuit 42 into a digital signal.

The signal processing circuit 44 is a logical circuit receiving the first output signal Vdet1 via the A/D conversion circuit 43 to detect the presence or absence of a touch on the sensor 10. The signal processing circuit 44 receives the second output signal Vdet2 obtained by the CDM drive based on the certain sign via the second electrode selection circuit 26 to perform decoding processing.

The first detection circuit 40 detects the presence or absence of a touch based on the control signal supplied from the detection control circuit 21 and the output signals Vdet supplied from the sensor 10. Specifically, the signal processing circuit 44 receives the output signals Vdet from the sensor 10 via the second electrode selection circuit 26. The signal processing circuit 44 performs processing to extract a differential signal of the output signals Vdet caused by the finger Fin (the absolute value $|\Delta V|$). The signal processing circuit 44 compares the absolute value $|\Delta V|$ with the certain threshold voltage. The signal processing circuit 44 determines that an external proximity object is in a noncontact state if this absolute value $|\Delta V|$ is less than the threshold voltage. On the other hand, the signal processing circuit 44 determines that the external proximity object is in a contact state if the absolute value $|\Delta V|$ is equal to or greater than the threshold voltage.

The memory 46 temporarily stores therein data indicating a computation result of the signal processing circuit 44. The memory 46 may be a random access memory (RAM), a read only memory (ROM), or a register circuit, for example.

The coordinates extraction circuit 45 calculates coordinates within the detection area FA based on the differential signal of the output signal and outputs the obtained touch panel coordinates as sensor output Vo. The sensor output Vo functions as output indicating a result of the touch detection in the first mode, which will be described later, or as output indicating a result of the fingerprint detection in the second mode, which will be described later. The detection control circuit 21 refers to the sensor output Vo in control of the operating mode and selection of the first electrodes Tx to be driven in the second mode. The coordinates extraction circuit 45 may output a decoded signal as the sensor output Vo without calculating the coordinates within the detection area FA.

The sensor output Vo at least during the second mode M2 is output to the determiner 150. The determiner 150 includes a memory 151 and a determination circuit 152, for example. The memory 151 stores therein registered fingerprint data that has been registered as a user of the display device 100. The determination circuit 152 performs fingerprint authentication. Specifically, the determination circuit 152 compares detected fingerprint data detected by the detection device 1 indicated by the sensor output Vo during the second mode M2 with the registered fingerprint data stored in the memory 151 to determine whether the detected fingerprint data matches the registered fingerprint data. The determination circuit 152 outputs a determination result of the fingerprint authentication as authentication result output Lo. The determination circuit 152 may perform comparison of only a partial pattern indicating characteristic points rather than the entire detected sensor output Vo. The detection control circuit 21 refers to the authentication result output Lo in determination whether the second mode is continued. Details of this process will be described later.

The authentication result output Lo of the determiner 150 is input to a setter 160. The setter 160 has a setting circuit 161 and a memory 162. The memory 162 records therein a plurality of pieces of security setting data different in accordance with the determination result of the fingerprint authentication. The setting circuit 161 sets the security setting data to be recorded in the memory 162 in accordance with the determination result of the fingerprint authentication included in the authentication result output Lo.

Identification of the sensor output Vo by the determination circuit 152, that is, management of the relation between the sensor output Vo and the operating mode may be performed by providing information for operating mode identification (a header, for example) to the sensor output Vo from the first detection circuit 40 or be performed by providing a signal including information that can identify the operating mode to the determination circuit 152 from the detection control circuit 21 like the various control signals Vctrl. A switch circuit performing control to cause the sensor output Vo to be input to the determination circuit 152 during the second mode and to cause the sensor output Vo not to be input to the determination circuit 152 during the first mode may be provided between the first detection circuit 40 and the determination circuit 152.

Although the determiner 150 is provided as a component of the display device 100 in the embodiment, it may be provided outside the display device 100. The determiner 150 may be provided in a central processing unit (CPU) or micro processing unit (MPU) disposed on an external board coupled to the wiring board 76 or be disposed in a device coupled to the display device 100 via a wireless or wired communicator, for example.

The first electrode blocks TxB each including more than one first electrode Tx are scanned in accordance with the third drive signal Vtx3 supplied from the first electrode selection circuit 25, whereby the sensor 10 can perform the detection of force applied onto the detection face (force detection) across the entire detection area FA. In the following, an operating mode when the force detection is performed is referred to as the third mode. For example, in the third mode M3, the first electrode block selection circuit 25a selects M first electrode blocks TxB, whereas the unit first electrode selection circuits 25b supply the third drive signal Vtx3 to 1 first electrodes Tx adjacent to each other included in each of the M first electrode blocks TxB. l is an integer of n or less. l may be the same number as m. M is an integer of N or less, and all the first electrode blocks TxB may be selected. The M first electrode blocks TxB are coupled to the second detection circuit 135 and are coupled to the different voltage detectors DET included in the second detection circuit 135. All the l first electrodes Tx included in the first electrode block TxB1 are coupled to a voltage detector DET1 of the second detection circuit 135, whereas all the l first electrodes Tx included in the first electrode block TxB2 are coupled to a voltage detector DET2 of the second detection circuit 135, for example. The second detection circuit 135 outputs force sensor output Po of each of the first electrode blocks TxB to the detection control circuit 21 based on a force detection signal Dtx output from each of the first electrode blocks TxB.

Figure 6:
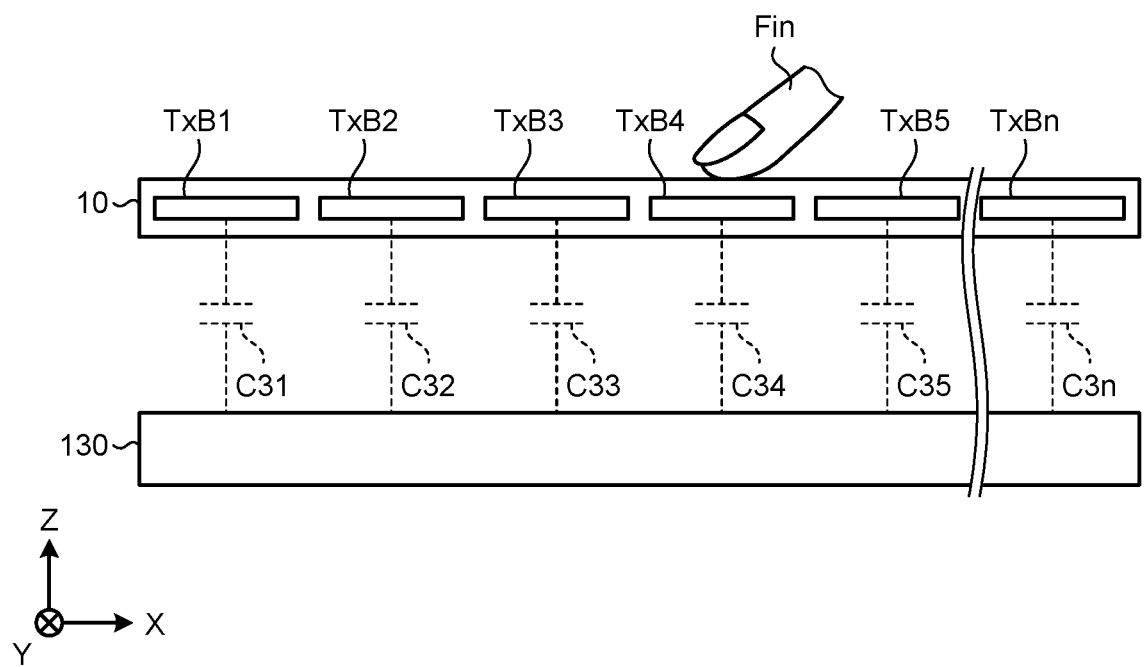
FIG. 6 is a schematic diagram of an example of a force detection operation.

FIG. 6 is a schematic diagram of an example of a force detection operation. In the embodiment, as illustrated in FIG. 2, the force detection member 130 is provided on an opposite side from the sensor 10 with the display panel 30 interposed therebetween. The force detection member 130 is metal, an alloy, or a compound, for example. The force detection member 130 is a member indicating a reference potential (GND).

In the first electrode block TxB to which the third drive signal Vtx3 has been given, capacitance corresponding to the distance from the force detection member 130 is generated. When force is applied to the detection face, the sensor 10 bends depending on the force, whereby the distance between the first electrode block TxB and the force detection member 130 changes. Thus, the third drive signal Vtx3 is given to each of the first electrode block TxB1, . . . , the first electrode block TxBn by time-division selection drive, for example, to acquire the force detection signal Dtx corresponding to changes in a capacitance C31 of the first electrode block TxB1, . . . , a capacitance C3n of the first electrode block TxBn, whereby force can be detected for each of the positions that are provided with the first electrode blocks TxB, respectively. The second detection circuit 135 (refer to FIG. 3) detects the force detection signals Dtx (refer to FIG. 3) from the respective first electrode blocks TxB corresponding to the capacitance C31 of the first electrode block TxB1, . . . , the capacitance C3n of the first electrode block TxBn to output a signal, as the force sensor output Po, indicating a force detection result at a position of each of the first electrode blocks TxB. As in the case with the first detection circuit 40, the second detection circuit 135 includes a detection signal amplifier circuit, an A/D conversion circuit, and a signal processing circuit, for example. The second detection circuit 135 amplifies the force detection signals Dtx by the detection signal amplifier circuit, converts analog signals into digital signals by the A/D conversion circuit, determines whether force has been applied in accordance with whether the differential of the signals is greater than a certain threshold by the signal processing circuit, and outputs the determination result as the force sensor output Po. The detection control circuit 21 refers to the force sensor output Po in determination whether to set the operating mode to the second mode. Details of this process will be described later.

Although the second sensing element 10*p* includes the first electrode blocks TxB, the force detection member 130, and the second detection circuit 135 in the embodiment, the specific configuration of the second sensing element is not limited to this example. Each of the first electrode block TxB can be replaced with one or more first electrodes Tx or second electrodes Rx, for example. When the force detection using the first electrodes Tx (the first electrode block TxB) is performed, the resolution of the force detection in the Y direction can be obtained. When the force detection using the second electrodes Rx is performed, the resolution of the force detection in the X direction can be obtained. When the second electrodes Rx are used as the second sensing element 10*p*, the second electrode selection circuit 26 may supply the third drive signal Vtx3 to the second electrodes Rx or the second electrode block RxS to be selected, in place of providing the second detection circuit 135. The force detection member 130 may be provided on the cover member 101, and the variable area VA may be disposed between the cover member 101 and the sensor 10. The second sensing element is not limited to the example in which the sensor 10 is used; a force sensor of another type may be provided. The force sensor may be a diaphragm gauge of micro electro mechanical systems (MEMS), a strain gauge, or a coil indicating a potential corresponding to the degree of deformation between supports of a member, for example. The force sensor may be disposed in the peripheral area PA such as between the cover member 101 and the decorating layer 110 or be disposed on the back side of the display panel 30 in place of the force detection member 130.

Figure 7:
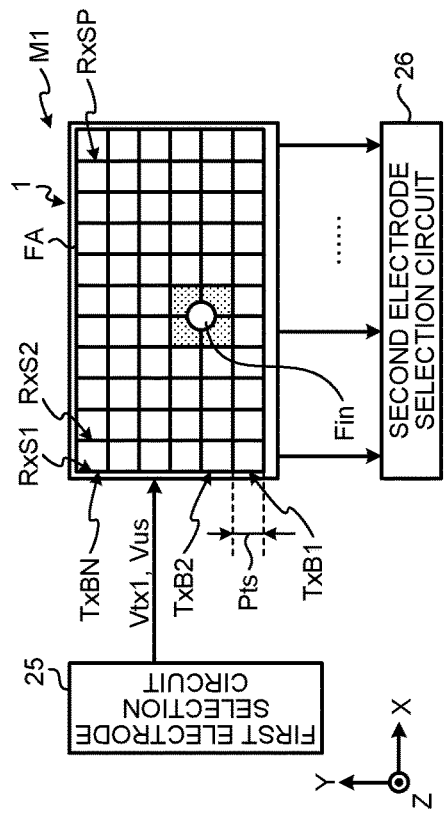
FIG. 7 is an illustrative diagram of a first mode.

The following describes the various kinds of operating modes in the detection device 1. FIG. 7 is an illustrative diagram of the first mode. As illustrated in FIG. 7, in the first mode M1, the detection device 1 performs detection of a finger Fin or the like by scanning the entire face of the detection area FA with a first detection pitch Pts larger than that of the second mode M2 (refer to FIG. 9). In the first mode M1, the first electrode selection circuit 25 supplies the first drive signal Vtx1 to the first electrode blocks TxB on a first electrode block TxB basis. The same first drive signal Vtx1 is supplied to at least the first electrodes Tx included in one first electrode block TxB. For example, in the first touch detection period, the first electrode block selection signal Vfbs having a High level is output from the first electrode block selection circuit 25*a* to the first electrode block TxBN, whereas the first electrode selection signal Vfs is supplied to m first electrodes TxN1, . . . , TxN4 (m=4 in the present example) selected in the first electrode block TxBN. Thus, the first drive signal Vtx1 is supplied from the first electrode selection circuit 25 to the first electrode TxN1, . . . , the first electrode TxN4. Further, in a first partial touch detection period during the first touch detection period, the second electrode selection circuit 26 causes the second electrode blocks RxS each including p second electrodes Rx adjacent to each other to be successively coupled to the detection circuit (the voltage detector DET) and to output the first output signal Vdet1 (p=5 in the present example). p is an integer of 1 or greater. Each first touch detection period includes the first partial touch detection period for outputting the first output signal Vdet1 from a second electrode block RxS1 to a Pth partial touch detection period for outputting the first output signal Vdet1 from a second electrode block RxSP. P is an integer of 1 or greater. Thus, in the first mode M1, detection can be performed with the first detection pitch Pts larger than that of the second mode M2, which will be described later. In the first mode M1, the touch detection of a finger Fin or the like can be performed, for example. The certain potential Vus is supplied to the first electrodes Tx that are not selected.

Figure 8:
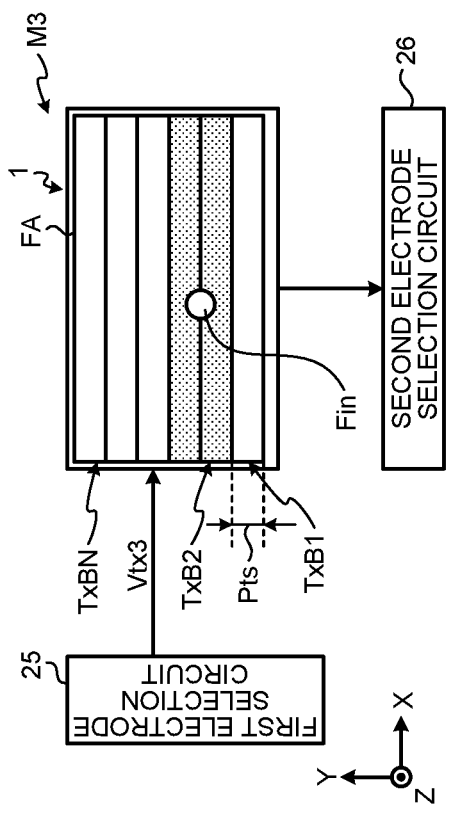
FIG. 8 is an illustrative diagram of a third mode.

FIG. 8 is an illustrative diagram of the third mode. As illustrated in FIG. 8, in the third mode M3, the detection device 1 scans the entire face of the detection area FA in the Y direction with the first detection pitch Pts like that of the first mode M1, that is, with the first detection pitch Pts larger than that of the second mode M2 (refer to FIG. 9) to perform the detection of force applied by the finger Fin, for example. More specifically, in the third mode M3, the first electrode selection circuit 25 supplies the third drive signal Vtx3 to the M first electrode blocks TxB, whereas the second detection circuit 135 couples the M first electrode blocks TxB supplied with the third drive signal Vtx3 to different voltage detectors DET, respectively. Thus, the force detection signal Dtx is supplied to the second detection circuit 135 from the sensor 10. The same third drive signal Vtx3 is supplied to at least the first electrodes Tx included in one first electrode block TxB.

Figure 9:
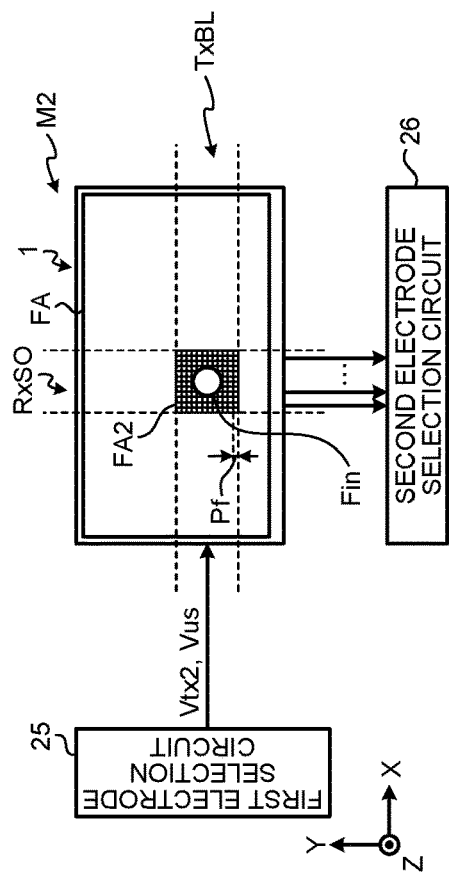
FIG. 9 is an illustrative diagram of a second mode.

FIG. 9 is an illustrative diagram of the second mode. As illustrated in FIG. 9, in the second mode M2, the detection device 1 scans part of the detection area FA with a second detection pitch Pf smaller than that of the first mode M1 (refer to FIG. 7) to perform detection of a finger Fin or the like. In the second mode M2, the first electrode selection circuit 25 supplies the second drive signal Vtx2 to each of the first electrodes Tx. Thus, in the second mode M2, the detection device 1 can perform detection with the second detection pitch Pf smaller than that of the first mode M1. For example, in the second mode M2, the CDM drive is performed in which the second drive signal Vtx2 is supplied to the first electrodes Tx selected based on the certain sign, whereby the fingerprint detection of the finger Fin or the like can be performed more clearly.

In the second mode M2, the detection device 1 performs detection with the second detection pitch Pf in a second partial area FA2, which is a region overlapping with the position at which a finger Fin or the like has been detected in the first mode M1. Specifically, the detection control circuit 21 outputs the various control signals Vctrl controlling the first electrode selection circuit 25 so as to supply the second drive voltage Vtx2 to the first electrodes Tx included in the first electrode block TxB corresponding to the coordinates at which the finger Fin has been detected in the first mode M1. Assume that the first electrode block TxB corresponding to the coordinates at which the finger Fin has been detected in the first mode M1 is a first electrode block TxBL, for example. In this case, the first electrode selection circuit 25 supplies the first electrode block selection signal Vfbs to select the first electrode block TxBL and supplies the first electrode selection signal Vfs corresponding to a code based on the certain sign to the first electrode block TxBL. Thus, the CDM drive is executed in the first electrode block TxBL. Assume that the second electrode block RxS corresponding to the coordinates at which the finger Fin has been detected is a second electrode block RxSO. In this case, the detection control circuit 21 outputs the second electrode selection signal Vhsel for controlling the second electrode selection circuit 26 so as to limit the second electrodes Rx to be selected by the second electrode selection circuit 26 to the second electrodes Rx corresponding to the coordinates at which the finger Fin has been detected in the first mode M1. In accordance with the various control signals Vctrl and the second electrode selection signal Vhsel, the second electrode selection circuit 26 successively drives the second electrodes included in the selected second electrode block RxSO. Thus, the second partial area FA2 is set to an area in which the limited first electrodes Tx and second electrodes Rx cross each other on the X-Y plane, whereby the size of the second partial area FA2 can be reduced, and thus power consumption required for detection can be reduced, thus achieving power saving.

In the embodiment, the operation in the third mode M3 is performed when a touch operation has been detected in the first mode M1. That is to say, the third mode M3 of the embodiment is a mode of detecting the application of force along with the first mode M1.

In the touch detection and the force detection by the detection device 1, a plurality of places may be detected due to multi-touch on the detection face. In the embodiment, the detection control circuit 21 may set the first electrode block TxB corresponding to coordinates at which the highest force has been detected in force data included in the force sensor output Po output from the second detection circuit 135, as the second partial area FA2 in the second mode M2. When one place is detected as a touch detection place owing to single-touch, the coordinates at which the highest force has been detected are the coordinates of the one place. The second detection circuit 135 may output the coordinates at which the highest force has been detected as the force sensor output Po to the detection control circuit 21. Further, the detection control circuit 21 may set the second electrodes Rx where a finger (Fin) has been detected at a time at which the first drive signal Vtx1 has been supplied to the first electrode block TxB in which the highest force has been detected, as the second electrodes Rx included in the second partial area FA2 in the second mode M2.

Figure 10:
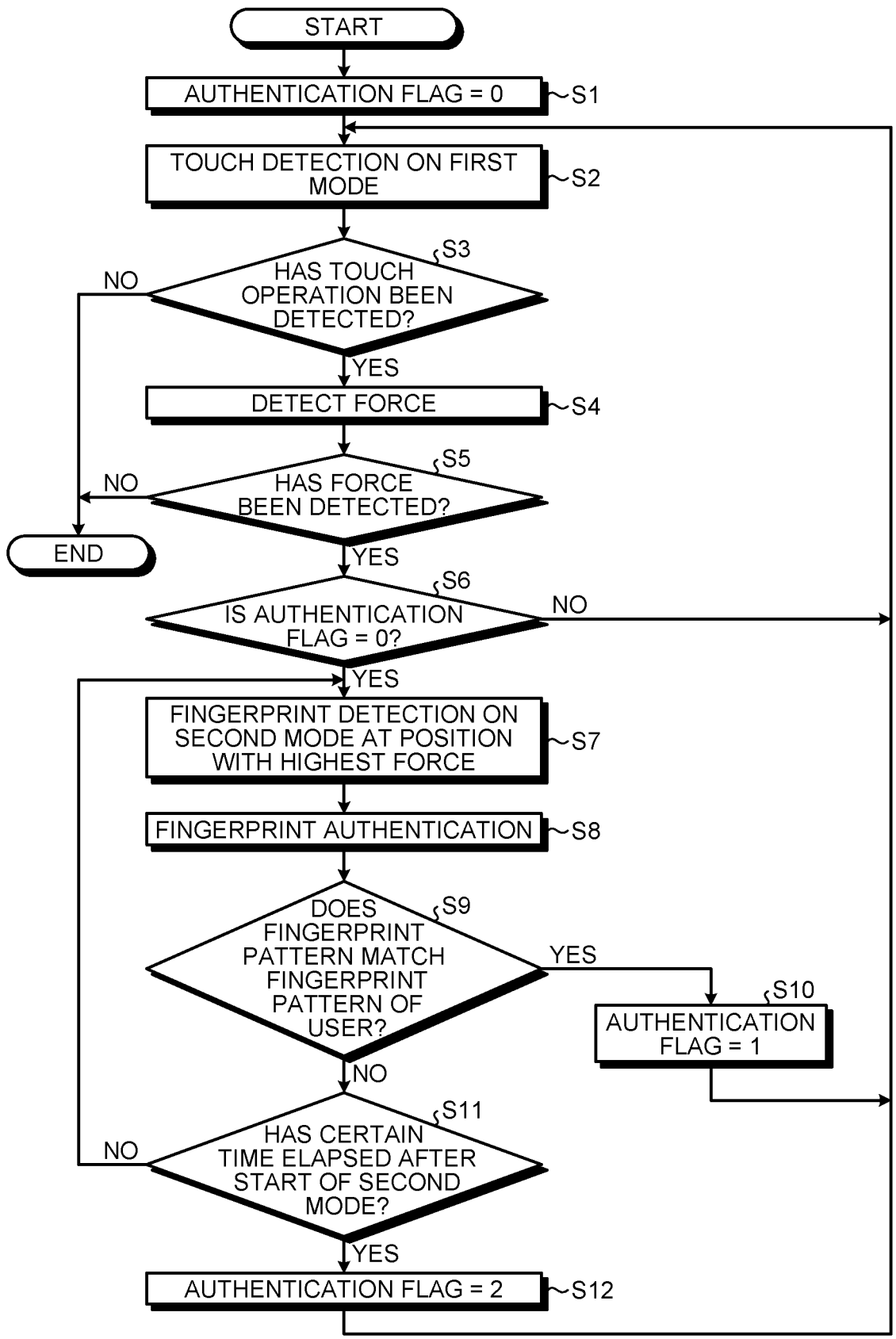
FIG. 10 is a flowchart of an example of a procedure of processing about control of an operating mode.

The detection control circuit 21 controls the operating mode of the detection device 1. FIG. 10 is a flowchart of an example of a procedure of processing about control of the operating mode. The detection control circuit 21 sets a flag value (an authentication flag) to an initial value (0) (Step S1). The authentication flag value is a value for managing an authentication state of a fingerprint pattern of a user of the display device 100. The authentication flag value is stored in the memory 151, for example. In the embodiment, the authentication flag value is data of 2 bits or more.

After setting the authentication flag value to the initial value (0), the detection control circuit 21 outputs the various control signals Vctrl to operate the first electrode selection circuit 25 in the first mode M1. Thus, the first drive signal Vtx1 is supplied from the first electrode selection circuit 25 to each of the first electrode blocks TxB, thus performing the touch detection in the first mode M1 (Step S2).

In the embodiment, when no touch operation on the detection face has been detected in the processing at Step S2 (No at Step S3), the process is ended. When no touch operation on the detection face has been detected, the process is ended, and then when the touch detection in the first mode is performed again, the authentication flag value is reset to the initial value (0) (Step S1).

If a touch operation on the detection face has been detected in the processing at Step S2 (Yes at Step S3), the detection control circuit 21 outputs the various control signals Vctrl to operate the first electrode selection circuit 25 in the third mode M3. Thus, the third drive signal Vtx3 is supplied from the first electrode selection circuit 25 to each of the first electrode blocks TxB, thus performing the force detection (Step S4).

In the embodiment, if no force has been detected in the processing at step S4 (No at Step S5), the process is ended. When no force has been detected, the process is ended, the authentication flag value is reset again to the initial value (0) (Step S1), and then the touch detection in the first mode is performed (Step S2).

If a force has been detected in the processing at Step S4 (Yes at Step S5) and if the authentication flag is 0 (Yes at Step S6), the detection control circuit 21 outputs the various control signals Vctrl to operate the first electrode selection circuit 25 in the second mode M2. Thus, the second drive signal Vtx2 is supplied from the first electrode selection circuit 25 to each of the first electrodes Tx corresponding to the position of the second partial area FA2, and the fingerprint detection in the second mode M2 is performed at a position with the highest force (Step S7). Along with the processing at Step S7, the counter 21c counts an operation continuing time of the second mode M2. This count will not be reset until the operating mode shifts from the second mode M2 to another mode. The counter 21c may be reset when the process of the flowchart is ended (No at Step S3 or No at Step S5).

After the processing at Step S7, the determination circuit 152 performs the fingerprint authentication (Step S8). If the fingerprint pattern obtained in the processing at Step S7 matches the fingerprint pattern of the user indicated by the fingerprint pattern data stored in the memory 151 (Yes at Step S9), the detection control circuit 21 sets the authentication flag to 1 (Step S10). Along with the processing at Step S10, the count of the counter 21c is reset. After the processing at Step S10, the process shifts to the processing at Step S2. When the authentication flag is set to 1, the authentication result output Lo including information indicating that the authentication flag is 1 is output to the setter 160. When the authentication flag is 1, the setter 160 sets first security setting data having a relatively high security level. The security setting that is set by the setter 160 is reset when the process of the flowchart is ended (No at Step S3 or No at Step S5).

Assume that after the authentication flag became 1 by the processing at Step S10, the following steps were continuously performed, that is, the touch detection was performed (Step S2), a touch operation was detected (Yes at Step S3), the force detection was performed (Step S4), and a force was detected (Yes at Step S5). In this case, the authentication flag is not 0 (No at Step S6), and thus the process shifts to the processing at Step S2. That is to say, after the matching comparison of the fingerprint pattern of the user has been finished by the fingerprint authentication, the operation in the second mode M2 is not performed again until the process of the flowchart is caused to end with no touch operation being detected.

On the other hand, if the fingerprint pattern obtained in the processing at step S7 does not match the fingerprint pattern of the user indicated by the fingerprint pattern data stored in the memory 151 (No at Step S9), the detection control circuit 21 determines whether a certain time has elapsed after the start of the second mode M2 based on the operation continuing time of the second mode M2 counted by the counter 21c (Step S11). Data indicating the certain time is stored in the detection control circuit 21 or a memory that the detection control circuit 21 can access. If it is determined that the certain time has not elapsed after the start of the second mode M2 (No at Step S11), the process shifts to the processing at Step S7. That is to say, the second mode M2 is continued to obtain another fingerprint pattern and perform the fingerprint authentication.

On the other hand, if it is determined that the certain time has elapsed after the start of the second mode M2 in the processing at Step S11 (Yes at Step S11), the detection control circuit 21 sets the authentication flag to 2 (Step S12). Along with the processing at Step S12, the count of the counter 21c is reset. After the processing at Step S12, the process shifts to the processing at Step S2. When the authentication flag is set to 2, the authentication result output Lo including information indicating that the authentication flag is 2 is output to the setter 160. When the authentication flag is 2, the setter 160 sets second security setting data having a relatively low security level. The security setting set by the setter 160 is reset when the process of the flowchart is end (No at Step S3 or No at Step S5).

Assume that after the authentication flag became 2 by the processing at Step S12, the following steps were continuously performed, that is, the touch detection was performed (Step S2), a touch operation was detected (Yes at Step S3), the force detection was performed (Step S4), and a force was detected (Yes at Step S5). In this case, the authentication flag is not 0 (No at Step S6), and thus the process shifts to the processing at Step S2. That is to say, if a fingerprint pattern matching the fingerprint pattern of the user cannot be obtained by the fingerprint authentication during continuous operation in the second mode M2 for the certain time, even when the touch operation continues thereafter, the second mode M2 is not performed again until the process shifts to a reset state with no touch operation being detected.

As described above, according to the embodiment, the detection device 1 is provided to be switched between the first mode M1 of outputting the first drive signal Vtx1 to the first electrode blocks TxB at different times and the second mode M2 of outputting the second drive signal Vtx2 to some of the first electrodes Tx and starts the operation in the second mode when a force has been detected. Thus, the detection of force can be a starting condition of the fingerprint detection by the detection device 1. Consequently, the second mode is not started when no force is detected, thereby reducing an increase in power consumption that would be caused by individual driving of the first electrodes Tx for acquisition of the fingerprint pattern, and thus achieving further power saving. The signal is output to some of the first electrodes Tx in the second mode M2, whereby the first electrodes Tx to be driven can be limited, thus achieving further power saving.

The second sensing element of the embodiment detects a force applied on each of the partial areas (partial areas overlapping the respective first electrode blocks TxB on the X-Y plane, for example) arranged in at least one (the Y direction, for example) of the X direction and the Y direction. In the second mode M2, the second drive signal Vtx2 is output to the first electrodes Tx corresponding to a partial area in which the highest force has been detected among the partial areas. Thus, even when multi-touch has been performed, the first electrodes Tx to be used in the second mode M2 can be limited to the first electrodes Tx corresponding to the partial area in which the highest force has been detected, thus achieving further power saving.

According to the embodiment, the detection device 1 includes the determiner 150 determining whether the fingerprint pattern obtained based on the capacitance detected in the second mode M2 matches preregistered fingerprint pattern data (the fingerprint pattern data stored in the memory 151, for example). When it is determined that the fingerprint pattern matches the preregistered fingerprint pattern data, the first electrode selection circuit 25 ends the operation on the second mode. Consequently, unnecessary continuation of the second mode M2 after completion of the fingerprint authentication can be inhibited, thus achieving further power saving.

After it is determined that the fingerprint pattern detected in the second mode M2 matches the preregistered fingerprint pattern data, the first electrode selection circuit 25 does not operate on the second mode M2 while the detection of force by the second sensing element 10p continues. Thus, the detection of force along with a touch operation continuing after completion of the fingerprint authentication can be handled as the detection of force along with a series of touch operations by the user for which the fingerprint authentication has completed. Consequently, unnecessary resumption of the second mode M2 after completion of the fingerprint authentication can be inhibited, thus achieving further power saving.

After it is determined that the fingerprint pattern detected in the second mode M2 matches the preregistered fingerprint pattern data, the signal output circuit (the first electrode selection circuit 25) does not operate on the second mode M2 while the touch detection on the first mode M1 continues. Thus, a touch operation continuing after completion of the fingerprint authentication can be handled as a series of touch operations by the user for which the fingerprint authentication has completed. Consequently, unnecessary resumption of the second mode M2 after completion of the fingerprint authentication can be inhibited, thus achieving further power saving.

In the embodiment, after it is determined that the fingerprint pattern detected in the second mode M2 matches the preregistered fingerprint pattern data, when even one of the touch operation and the application of force has not been detected, the process shifts to the reset state, and the authentication flag becomes 0. However, even when no force has been detected, the process may not necessarily shift to the reset state while the touch operation continues, or even when no touch operation has been detected, the process may not necessarily shift to the reset state while the application of force continues. That is to say, the detection device 1 may not necessarily operate on the second mode M2 again while at least one of the touch operation and the application of force having functioned as a starting condition of the second mode M2 corresponding to the completed fingerprint authentication continues. With this operation, further power saving can be achieved.

The first electrode selection circuit 25 automatically shifts to the first mode M1 after operating in the second mode M2 continuously for a certain period of time. Thus, when the fingerprint authentication does not complete for a certain period of time due to the fingerprint pattern detected in the second mode M2 not having matched the preregistered fingerprint pattern data, such as a fingerprint pattern of a non-preregistered user having been acquired, the second mode M2 can automatically be discontinued. Consequently, unnecessary elongation of the operating time on the second mode M2 can be inhibited, thus achieving further power saving.

Figure 11:
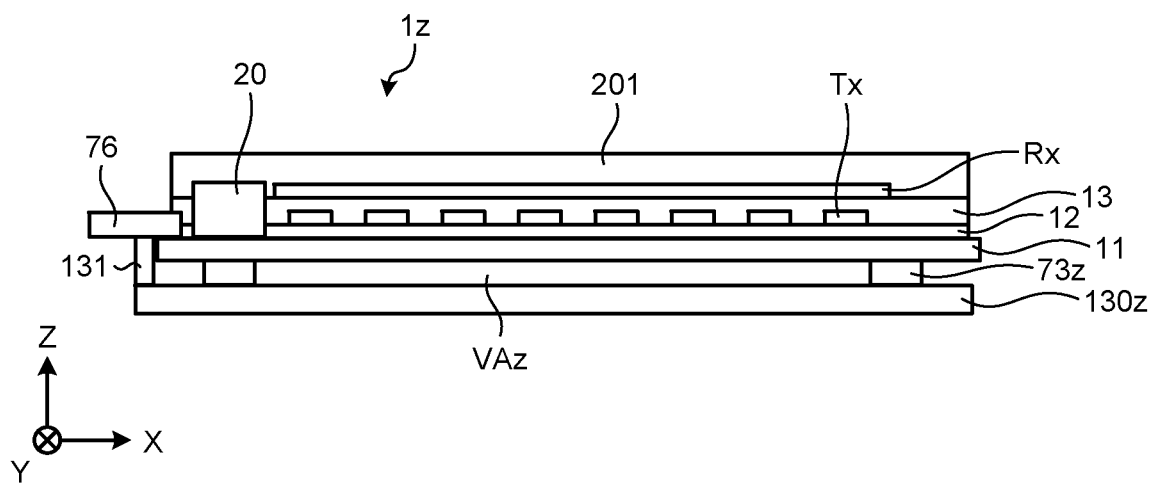
FIG. 11 is a diagram of a principal configuration example of the detection device.

FIG. 11 is a diagram of a principal configuration example of a detection device 1z. Although the embodiment describes the display device 100 including the display panel 30 as an example, the display panel 30 can be omitted. As in the detection device 1z illustrated in FIG. 11, the detection device may be a detection device having no display function like a touch pad provided in a notebook computer, for example. As illustrated in the detection device 1z, a protective layer 201 may cover the sensor 10 without having the cover member 101. The protective layer 201 is an inorganic or organic resin layer, for example. In the detection device 1z, the protective layer 201 forms the detection face. As illustrated in the detection device 1z, the second electrodes Rx may be disposed at positions closer to the detection face with respect to the first sensor substrate 11 than the first electrodes Tx are, or may be formed in the same layer as that of the first electrodes Tx and coupled thereto via an insulating layer and bridge electrodes. A force detection member 130z is coupled to the first sensor substrate 11 via a coupling member 73z. A variable area VAz formed between the first sensor substrate 11 and the force detection member 130z changes by force, whereby the distance between the first electrodes Tx and the force detection member 130z varies, and the second sensing element (the force-sensing element) detects a signal based on a capacitance change caused thereby. Although the display device 100 is configured as what is called an out-cell system, in which the sensor 10 and the display panel 30 are independent from each other, it may be configured as what is called an in-cell system or on-cell system, in which some of substrates or electrodes of the sensor 10 and the display panel 30 work for both of them.

It is understood that other effects produced by the aspects described in the embodiment that are obvious from the description of the present specification or that can be conceived as appropriate by those skilled in the art are naturally produced by the present disclosure.

What is claimed is:

1. A detection device comprising:
a first electrode extending in a first direction along a detection face;
a plurality of second electrodes extending in a second direction that crosses the first direction along the detection face, and facing the first electrode;
a signal output circuit configured to output a signal to the first electrode;
a detection circuit configured to detect capacitance generated between the first electrode and the second electrodes in accordance with the signal; and
a force-sensing element configured to detect force applied to the detection face,
wherein a plurality of first electrode blocks each including a plurality of the first electrodes are arranged in the second direction, and
wherein the signal output circuit is provided to be switched between a first mode of outputting the signal to the first electrode blocks at different times and a second mode of outputting the signal to some of the first electrodes and is configured to start operation on the second mode when the force is detected.

2. The detection device according to claim 1,
wherein the force-sensing element detects the force for each of a plurality of partial areas arranged in at least one of the first direction and the second direction, and
wherein, in the second mode, the signal is output to the first electrode corresponding to a partial area in which the highest force has been detected among the partial areas.

3. The detection device according to claim 1, further comprising a determiner configured to determine whether a fingerprint pattern obtained based on the capacitance detected in the second mode matches preregistered fingerprint pattern data,
wherein when it is determined that the fingerprint pattern matches the preregistered fingerprint pattern data, the signal output circuit ends the operation on the second mode.

4. The detection device according to claim 3,
wherein after it is determined that the fingerprint pattern matches the preregistered fingerprint pattern data, the signal output circuit does not operate on the second mode while detection of force by the force-sensing element continues.

5. The detection device according to claim 3,
wherein after it is determined that the fingerprint pattern matches the preregistered fingerprint pattern data, the signal output circuit operates on the first mode and does not operate on the second mode while touch detection on the first mode continues.

6. The detection device according to claim 1,
wherein the signal output circuit automatically shifts to the first mode after operating on the second mode continuously for a certain time.

7. A display device comprising:
a display panel configured to display an image on a display face;
a first electrode extending in a first direction along the display face;
a plurality of second electrodes extending in a second direction that crosses the first direction along the display face, and facing the first electrode;
a signal output circuit configured to output a signal to the first electrode;
a detection circuit configured to detect capacitance generated between the first electrode and the second electrodes in accordance with the signal; and
a force-sensing element configured to detect force applied to the display face,
wherein a plurality of first electrode blocks each including a plurality of the first electrodes are arranged in the second direction, and
wherein the signal output circuit is provided to be switched between a first mode of outputting the signal to the first electrode blocks at different times and a second mode of outputting the signal to some of the first electrodes and is configured to start operation on the second mode when the force is detected.

* * * * *